Figure 1:
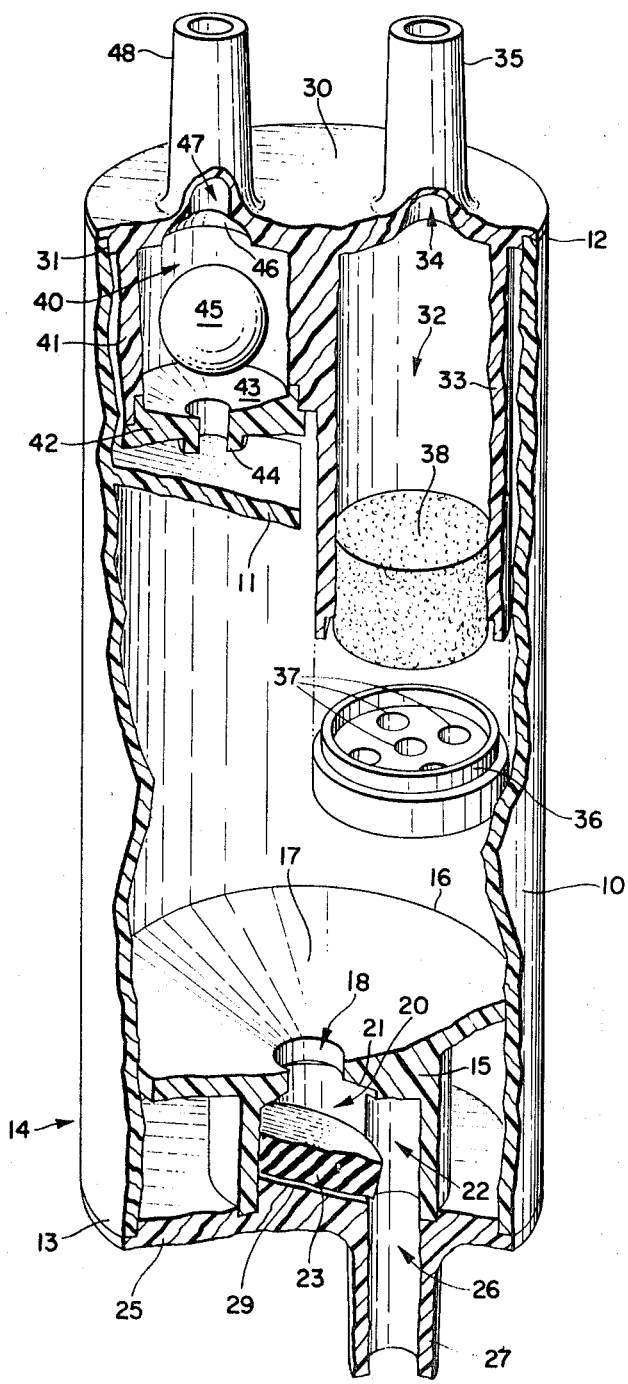

United States Patent

[11] 3,601,140

[72] Inventor Robert Edward Hooper
 Oakville, Ontario, Canada
[21] Appl. No. 830,072
[22] Filed June 3, 1969
[45] Patented Aug. 24, 1971
[73] Assignee Torginol Industries Incorporated

[54] LIQUID TRAP
 8 Claims, 2 Drawing Figs.

[52] U.S. Cl. .................................................. 137/107,
 137/205, 137/204, 137/199
[51] Int. Cl. .................................................. F16t 1/18
[50] Field of Search .......................................... 137/107,
 205, 202, 204, 519, 520, 199; 141/59; 103/236

[56] References Cited
UNITED STATES PATENTS
1,714,300 5/1929 Denney ........................ 137/519
3,002,523 10/1961 Rabbitts ....................... 137/205

3,424,098 1/1969 Bender ........................ 103/236 X
FOREIGN PATENTS
405,385 2/1934 Great Britain ................ 137/202
884,506 4/1943 France ........................ 137/205
684,153 4/1964 Canada ....................... 137/205

Primary Examiner—Alan Cohan
Attorney—George A. Rolston

ABSTRACT: Liquid trap for use in vacuum systems where liquid flow is induced by the application of a vacuum, for the purpose of preventing accidental flow of liquid to the vacuum source. The trap incorporates a chamber connected in the vacuum line, and having an automatic drain valve closed by the application of the vacuum and opening when the vacuum is terminated, the chamber being also provided with an additional safety valve closing the vacuum line if any small quantity of liquid should escape from the chamber into the vacuum line.

PATENTED AUG24 1971

SHEET 1 OF 2

3,601,140

*Inventor*
ROBERT EDWARD HOOPER

*by:* George A. Rolston

LIQUID TRAP

This invention relates to a trap for liquids such as water and the like for use in vacuum systems, and finds its principal application in systems for dispensing hot and cold beverages in automobiles, utilizing the vacuum induced in the induction manifold of the automobile engine.

In beverage dispensing systems of this type, the vacuum induced in the inlet manifold of the automobile engine is utilized to draw a liquid beverage, such as water, or some beverage flavoring in liquid form from a storage container in the trunk of the automobile, through a system of pipes, into the passenger compartment of the automobile where it is dispensed into a cup. Various safeguards are designed into the dispensing system itself, and particularly the dispensing head located in the passenger compartment usually under the dashboard, for preventing any such liquid being carried over into the tube connecting the system to the inlet manifold. In addition, it has been the practice in the past to provide a crude form of liquid trap between the remainder of the dispensing system and the inlet manifold. Such a liquid trap consisted essentially of a large glass bottle having a removable cap, and the vacuum tube system was connected, through the cap. The tube was simply cut and connected through two separate holes in the cap, and as the vacuum was applied through one tube, it exhausted the air in the bottle and induced a vacuum in the other tube. Obviously, any water which might accidentally be carried over through the one tube connected to the dispensing head would be trapped in the glass bottle and not carried over into the other tube.

Such a system is disclosed in U.S. Pats. No. 3,168,914 and 3,467,230.

There are certain disadvantages inherent in such a relatively crude liquid trap. For example, it was generally necessary to provide a glass bottle of fairly substantial size since the average car owner might check the contents of the bottle fairly infrequently with the result that it was necessary to provide it with a fairly substantial capacity. The mere size of the glass bottle form of trap made it somewhat difficult to install in smaller sizes of automobiles, bearing in mind that the glass bottle and supporting system were installed in the engine compartment of the automobile. In addition, the size of the bottle caused the development of relatively substantial stresses in the bottle, the pressure per square inch on the outside of the bottle obviously being increased as the size of the bottle increased. This resulted in a serious danger of implosion which could only be avoided by making the bottle of a very substantial thickness, requiring custom moulding at considerable expense. A further disadvantage lay in the fact that if the bottle contained a substantial volume of liquid, although was not yet filled to capacity, the motion of the automobile caused the liquid to splash within the bottle, and there was a tendency for small droplets of liquid to be carried over into the inlet manifold thereby causing damage to the engine.

It is therefore a general objective of the present invention to provide a liquid trap for vacuum systems which incorporates self-draining means, which is of reduced size, enabling it to be fitted in any part of the automobile, and making it resistent to implosion.

More particularly, it is an objective of the present invention to provide a liquid trap having the foregoing advantages which is additionally provided with safety valve means making it resistent to carrying over of liquids by splashing or the like.

More particularly, it is an objective of the present invention to provide a liquid trap having the foregoing advantages incorporating means for reducing turbulence of liquids flowing therein.

More particularly, it is an objective of the present invention to provide a liquid trap having the foregoing advantages incorporating drain valve means permitting the same to drain automatically as soon as it contains a predetermined excess quantity of liquid.

In a general way, the invention provides for certain of these advantages by the use of a small size container having upper and lower ends, the upper ends being provided with two conduits communicating with the interior of the container, one of which is connectable to the source of vacuum such as the inlet manifold and the other of which is connected to the liquid system such as the beverage dispensing system referred to. At the lower end of the container there is provided a drain port covered by a simple form of closure flap, of such a weight and area as to be closed automatically upon the application of the vacuum to the interior of the container, but opening upon the container being filled with a predetermined quantity of liquid. Additionally, a safety valve is preferably provided in communication with the vacuum conduit which is adapted to remain open during normal operation but to close instantaneously upon any small quantity of liquid trying to enter the valve. Preferably, there is further provided on the dispensing system conduit, a means for reducing turbulence in the incoming liquid.

Figure 2:
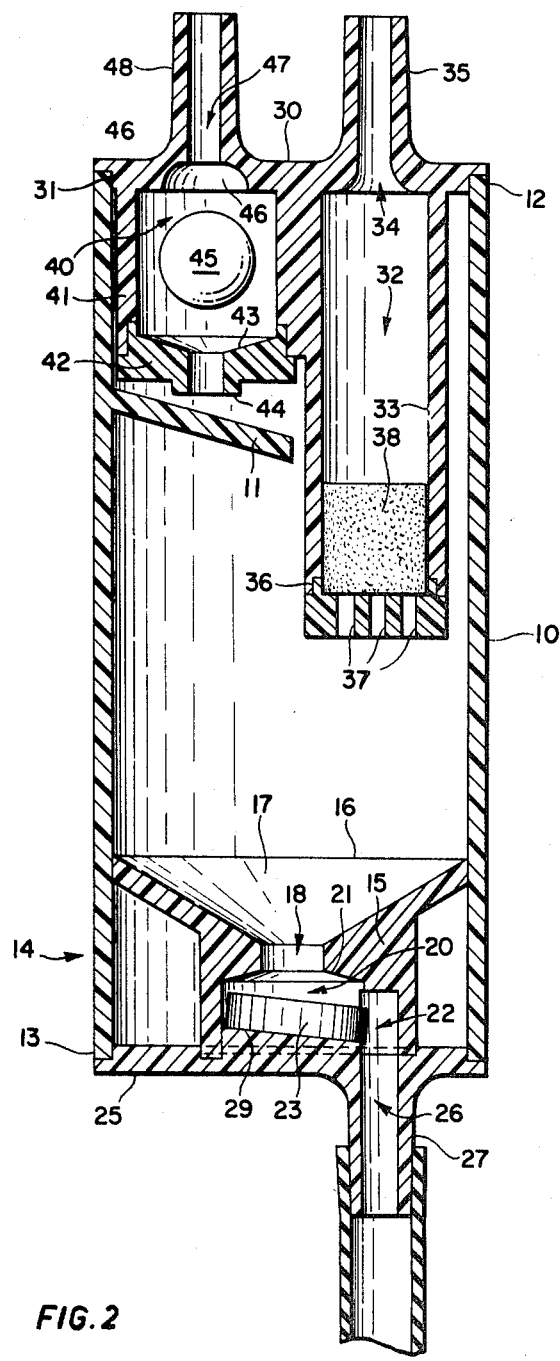

The foregoing and other objectives of the invention will become apparent from the following description of a preferred embodiment of the invention which is given below with reference to the following drawings in which like reference devices refer to like parts thereof throughout the various view and diagrams and in which:

FIG. 1 is a cutaway upper perspective illustration of a liquid trap according to the invention, and FIG. 2 is a section along the line 2—2 of FIG. 1.

Referring now to FIG. 1, it will be seen that the liquid trap according to the present invention comprises essentially a cylindrical container 10 which in the case of the normal automobile beverage dispensing system may be only a matter of 4 to 6 inches in height and 1 to 2 inches in width, and is made of relatively substantial gauge plastic, preferably by injection moulding techniques or the like, whereby it is completely resistent to implosion stresses induced by the vacuum. More or less near its upper end, there is provided the angled semicircular baffle member 11 moulded integrally with the container 10, and angled slightly towards one end of container 10 for reasons to be described below. The upper end of container 10 is designated 12 and the lower end is designated as 13.

In order to close the lower end of container 10, and to provide a self-draining valve means, there is provided the two part end closure indicated by the general reference 14 which consists of the end cap member 15 having an upper circular rim portion 16 formed thereon designed to fit tightly within container 10. The upper surface of closure 15, facing into container 10 is formed in an inverted conical manner to provide a funnel portion 17, at the bottom of which is the drain hole 18. The underside of member 15 is provided with a downwardly dependent sleeve 19 defining an inner annular valve recess 20, communicating with drain hole 18, and having an upwardly directed angled valve seat 21. A liquid flow passage 22 is provided to one side of valve recess 20, of a depth somewhat less than recess 20, for reasons to be described. Within recess 20 a resilient valve flap or disc member 23 is provided, being of such dimensions that it can move freely up and down within recess 20, and seat firmly on the angled valve seat portion 21.

In order to retain disc 23 within recess 20, there is provided a generally flat disc-shaped retaining member 25 having a liquid outlet opening 26 therethrough provided with a downwardly directed spigot 27, for connection to a drain pipe P. Retaining member 25 is of such a shape and dimensions as to mate with end 13 of container 10 as shown and has a more or less annular groove 28 to receive sleeve 19 therein, whereby to locate it in the correct orientation. In order to cause the valve disc or flap member 23 to adopt a downwardly angled position when the valve is open, a generally circular raised platform portion 29 is provided on the upwardly directed surface of member 25, of such dimensions as to fit within valve recess 20, and having an upper surface which is angled upwardly at one side, with respect to the transverse axis of member 25 opposed 180° to flow passage 22 whereby to cause the flap member 23 to move between open and closed positions in a swinging or tilting manner.

At the upper end of cylindrical container 10 there is provided the vacuum connection means adapted for connection to the vacuum line leading to the inlet manifold of the automobile on the one side, and on the other side, for connection to the dispensing head or console (not shown) arranged in the passenger compartment of the automobile. Such connection means comprises the upper end fitting generally designated as 30 having a reduced shoulder portion 31 shaped to fit within the interior of container 10, and being bonded therein by suitable adhesives, or solvent materials, or by heat welding and the like. Connection member 30 is provided with a liquid inlet chamber 32 having cylindrical sidewalls 33 and provided at its upper end with liquid conduit 34 and connection spigot 35 extending upwardly therefrom. Chamber 32 is of greatly increased size in relation to conduit 34 whereby to provide for free circulation of incoming liquid from conduit 34 and at the same time to reduce the velocity thereof, prior to entering container 10. At the lower end of chamber 32 there is provided outlet grating member 36 having a plurality of outlet holes 37 therein designed to deliver liquid from chamber 32 in a finely divided drops. Within chamber 32 there is provided a strainer member 38 consisting of a generally cylindrical block of porous spongelike foam plastic material for still further reducing the velocity of liquids flowing through chamber 32 while permitting free air flow.

Connection to the vacuum source such as the inlet manifold of the automobile (not shown) is provided for by means of the valve chamber 40 formed by cylindrical sidewalls 41 moulded integrally with connection member 30 and having at its lower end, a plug member 42 provided with an upper surface of flattened generally conical shape indicated as 43 and a central air passageway 44 communicating with the interior of container 10. Within chamber 40 there is provided a spherical closure member or ball valve 45 of rubber or neoprene or like rubber material, having a diameter which is substantially reduced in relation to the interior diameter of chamber 40 whereby to permit flow of air therearound, and being of predetermined mass in relation to its diameter whereby to permit the same to be suspended or supported approximately midway up chamber 40 during flow of air therethrough under normal operating conditions of the system. At the upper end of chamber 40, there is provided the hemispherical valve seat 46 having a contour designed to fit snugly around ball valve 45 and make a good hermetic seal therewith. Air conduit 47 communicates from valve seat 46 to connection spigot 48 for connection of a suitable vacuum hose (not shown) thereto in known manner.

In operation, the liquid trap according to the invention, which as stated above is designed specifically in this preferred embodiment for incorporation in a vacuum operated liquid dispensing system in an automobile, it is preferably mounted within the engine compartment of an automobile by any suitable mounting bracket means (not shown). A vacuum hose (not shown) is connected by any suitable means to the inlet manifold of the automobile engine and is then fastened securely to spigot 48. A similar vacuum hose (not shown) is then connected to spigot 35, and the other end thereof is connected to the dispensing system (not shown) within the passenger compartment of the automobile. A liquid drain hose P is preferably connected to the spigot 27, and led down to the lower portion of the engine compartment whereby to permit liquid to escape freely beneath the automobile. It will thus be seen that the interior of container 10 is in direct communication with the inlet manifold of the automobile and is therefore evacuated to substantially the same reduced pressure as the inlet manifold of the automobile at all times while the engine is running. However, due to the reduced size of container 10, and the substantial thickness of the members of which it is constructed, there is of course no danger of implosion. As soon as a passenger in the automobile wishes to dispense liquid within the passenger compartment, a valve (not shown) is operated by the passenger which causes liquid to be drawn into a cup by means of the vacuum within container 10. Obviously, this involves the evacuation of a certain quantity of air within the cup, and also within the upper parts of the system, (not shown) and a certain quantity of air will be drawn in through conduit 34, chamber 32, and into container 10 and will then immediately pass through passageway 44 through chamber 40 and out of conduit 47. The passage of such air takes place at such velocity, as to cause ball valve 45 to rise upwardly off the conical surface 43 of plug member 42, but is calculated in such a manner as to be insufficient to cause ball valve 45 to rise all the way up chamber 40. Thus such air can flow more or less freely around ball 45 and into conduit 47 without obstruction. The air is of course drawn off by the vacuum in the induction manifold of the automobile in known manner.

It will be understood that throughout this operation, the valve flap member 23 is drawn firmly against the conical valve seat 21 closing drain hole 18 whereby no air can be drawn into container 10 through drain hole 18.

This then described the ideal operating conditions of the system.

However, in practice, possibly due to changes in the vacuum in the manifold, or possibly by some misjudgment of the passenger, or for some other reason a certain quantity of liquid is withdrawn from the cup during the filling operation, by means of the vacuum. Such liquid will of course be entrained with the air flowing from such cup and will immediately pass through the same flow path as the air, that is to say, it will pass through conduit 34, and enter chamber 32. Obviously, any such liquid droplet or small quantity of liquid entering chamber 32 will be travelling at a relatively high velocity, and the function of chamber 32 is to reduce such velocity. This is achieved in part by the size of chamber 32 which is of course substantially greater than the size of conduit 34, and also by the porous sponge member 38 through which air can pass freely, but which offers a certain resistence to the flow of liquid therethrough. In effect the sponge 38 permits the air to bypass the liquid and flow freely into container 10 thereby maintaining substantially equal pressures in both chamber 32 and container 10. The liquid will then filter gradually through the sponge 38 more or less under the influence of gravity alone. The sponge 38 is of such a size that the entire airflow under normal operation can pass through only 10 percent of the holes, the remaining 90 percent of the holes being more than sufficient to accommodate the small quantity of liquid resulting from each operation. Once the liquid is passed through sponge 38 it is then free to pass through the multiple openings 37 in grating 36 under the influence of gravity and will drop into container 10 as fine droplets. In this way, any tendency for the liquid to create turbulence within container 10 or to splash therein is eliminated. When the engine of the automobile is switched off, the vacuum within container 10 will be terminated, and the pressure within container 10 will, within a very short interval, stabilize to atmospheric pressure, at which point the weight of liquid accumulated within the container 10 will cause flap member 23 to move downwardly within valve recess 20, thereby permitting the liquid within container 10 to flow through drain hole 18, through the passageway 22, and into conduit 26. When the engine is started again, the force applied by the vacuum within container 10 will again cause flap member 23 to swing upwardly and make sealing engagement on valve seat 21 thereby permitting the system to continue to operate as before.

In the event that for some reason an excessive quantity of liquid should accumulate in container 10, or if for example due to movement of the automobile, a certain quantity of liquid should be splashed upwardly and pass around baffle 11, it will enter opening 44. The diameter and length of opening 44 in plug 42 is designed and engineered that although it will provide free flow of air therethrough under all normal operating conditions, when a single droplet of water or other liquid attempts to pass through such opening 44, its passage therethrough is substantially restricted, as a result of which the pressure within valve chamber 40 is reduced substantially below that within container 10, and such additional pressure reduction will upset the equilibrium of ball valve 45 which will then immediately cause it to rise upwardly within chamber 40, and to seat securely on the valve seat 46. As soon as this takes place, container 10 is no longer in communication with the vacuum in the inlet manifold of the automobile and the liquid within container 10 will be free to flow out through opening 18. So long as the automobile engine continues to run, the ball valve 45 will remain on its seat 46 and will prevent the entire system from being operated. However, as soon as the automobile engine is switched off, the vacuum within conduit 47 will also be lost and the ball valve 45 will fall from seat 46 and rest on plug 42 once more and then be ready for operation as described above once more.

Obviously, this minor inconvenience to the passengers in the automobile can be overcome by the use of an additional control valve in the vacuum hose connected between spigot 48 and the automobile inlet manifold, although it is considered that the additional cost involved is not worthwhile in most cases. It will be understood that the inadvertent closure of ball valve 45 onto seat 46 will be highly unusual in practice. The engineering of the entire liquid trap unit is based upon the normal usage of an automobile which is seldom driven nonstop for a distance of much more than 200 miles, with a total passenger compliment of four people. The liquid droplets entrained as a result of the dispensing of a single cup of beverage comprise only fractions of an ounce, and the container 10, while being of quite small volume, is designed to accommodate the liquid droplets resulting from the dispensing of 20 or more cups of beverage. It is estimated that there will seldom, if ever, be occasions on which 20 or more cups of beverage are dispensed within a single journey with the automobile being stopped, and the ignition switched off, either for refilling of gasoline, or for some other reason.

Obviously however the engineering criteria which hold good in the case of automobile design will vary in the case of designs for use in other types of transportation such as for example, armored vehicles, naval vessels or air craft and the like.

The foregoing is a description of a preferred embodiment of the invention which is given here by way of example only. The invention is not to be taken as limited to any of the specific features as described, but comprehends all such variations thereof as come within the scope of the appended claims.

I claim:

1. Liquid trap apparatus for use in association with a vacuum system and comprising:
   a chamber adapted to be subjected to reduced pressures;
   air inlet port means communicating with said chamber and adapted to be connected into said vacuum system;
   an inlet airflow conduit communicating between said inlet port and said chamber;
   liquid flow velocity reduction means within said chamber to reduce the velocity and droplet size of liquid droplets entrained with air entering said chamber;
   outlet port means communicating with said chamber and adapted to be connected to said vacuum system;
   an outlet valve housing having upper and lower ends in direct gravity flow liquid communication with said chamber;
   valve seat means at said housing upper end and defining an air outlet opening;
   a valve closure member within said housing movable upward and downward in said housing between closed and open positions to close and open said air outlet opening, said housing, when said valve closure member is in its upper position, being open for direct gravity flow of liquid therein into said chamber;
   valve support means at said lower end of said outlet valve housing;
   air passageway means at said lower end of said outlet valve housing communicating with interior of said chamber;
   liquid baffle means within said chamber directly beneath and spaced below said outlet valve housing in registration with said air passageway means to deflect liquid droplets from entering said passageway means; and,
   automatic drain means for said chamber operable to release liquid therefrom upon termination of said reduced pressure in said chamber.

2. Liquid trap apparatus as claimed in claim 1 wherein said valve housing is of predetermined width and height, and wherein said valve closure member is of spherical shape of predetermined diameter and mass, arranged to permit free flow of air or the like around said closure member within said housing, while being responsive to entry of liquid within said housing, to move upwardly therein and make sealing engagement with said valve seat.

3. Liquid trap apparatus as claimed in claim 1 wherein said liquid drain means includes a generally concave-shaped drain recessed at the lower end of said chamber, and a drain hole at the lower most point of said drain surface, and valve means automatically closing said drain hole in response to the vacuum in said chamber.

4. Liquid trap apparatus as claimed in claim 1 including a liquid drain valve chamber of predetermined height and width, and in communication through an opening with said chamber, a valve seat around said drain opening in said valve chamber, and a valve closure member movable between upper and lower positions within said chamber of predetermined dimensions and mass, the weight and size of said valve member being arranged to cause said valve member to move into its upper position in sealing engagement with said valve seat in response to evacuation of said chamber, and liquid outlet means at a lower portion of said valve chamber.

5. Liquid trap apparatus as claimed in claim 4 wherein said valve seat is arranged in a predetermined plane at the upper end of said valve chamber and wherein the lower end of said valve chamber is arranged in a plane angled relative to the plane of said valve seat.

6. Liquid trap apparatus as claimed in claim 4 including a liquid flow channel formed at one side of said valve chamber, and a liquid drain conduit formed in the lower end of said valve chamber in registration with said flow channel.

7. Liquid trap apparatus as claimed in claim 1 wherein said liquid flow reduction means comprises a plug of porous material fastened within said inlet liquid flow conduit, said plug permitting free flow of air therethrough, while restricting flow of liquid therethrough.

8. Liquid trap apparatus as claimed in claim 1 wherein said chamber comprises a substantially cylindrical tubular member, a generally disc-shaped upper closure member for said chamber, said inlet and outlet port means being formed integrally therewith side by side along substantially parallel axes, and wherein said outlet valve housing is formed integrally with said upper closure member and depends downwardly into said chamber; and
   wherein said automatic drain means includes a generally disc-shaped concave drain member fitting snugly within the lower end of said chamber, and having a drain hole at the lowermost point thereof, and including a downwardly dependent drain valve housing formed integrally with said drain member and located within said chamber, and generally disc-shaped lower closure member for the lower end of said chamber mating with said downwardly dependent drain valve housing, and sealing and enclosing said drain member and drain valve housing within said chamber.